(12) United States Patent
Rinnai et al.

(10) Patent No.: US 12,241,979 B2
(45) Date of Patent: Mar. 4, 2025

(54) OPTICAL DISTANCE MEASURING DEVICE AND METHOD FOR THE SAME

(71) Applicant: DENSO CORPORATION, Kariya (JP)

(72) Inventors: Masato Rinnai, Kariya (JP); Isamu Takai, Kariya (JP)

(73) Assignee: DENSO CORPORATION, Kariya (JP)

( * ) Notice: Subject to any disclaimer, the term of this patent is extended or adjusted under 35 U.S.C. 154(b) by 1062 days.

(21) Appl. No.: 17/110,339

(22) Filed: Dec. 3, 2020

(65) Prior Publication Data

US 2021/0088663 A1 Mar. 25, 2021

Related U.S. Application Data

(63) Continuation of application No. PCT/JP2019/021710, filed on May 31, 2019.

(30) Foreign Application Priority Data

Jun. 6, 2018 (JP) .................................. 2018-108321

(51) Int. Cl.
| | |
|---|---|
| *G01S 17/42* | (2006.01) |
| *G01S 7/484* | (2006.01) |
| *G01S 7/486* | (2020.01) |
| *G01S 17/931* | (2020.01) |

(52) U.S. Cl.
CPC .............. *G01S 17/42* (2013.01); *G01S 7/484* (2013.01); *G01S 7/486* (2013.01); *G01S 17/931* (2020.01)

(58) Field of Classification Search
None
See application file for complete search history.

(56) References Cited

U.S. PATENT DOCUMENTS

| | | | |
|---|---|---|---|
| 2012/0075615 A1 | 3/2012 | Niclass et al. | |
| 2018/0329064 A1* | 11/2018 | Mellot | ..................... G01S 17/42 |

FOREIGN PATENT DOCUMENTS

| | | | | |
|---|---|---|---|---|
| CN | 108646252 A | * | 10/2018 | ............. G01S 17/08 |
| JP | 2012-063236 A | | 3/2012 | |
| JP | 2013190378 A | * | 9/2013 | |
| JP | 2014-077658 A | | 5/2014 | |
| JP | 5644294 B | | 12/2014 | |
| JP | 2016-161438 A | | 9/2016 | |
| JP | 2016-176750 A | | 10/2016 | |

* cited by examiner

*Primary Examiner* — Luke D Ratcliffe
(74) *Attorney, Agent, or Firm* — Maschoff Brennan

(57) ABSTRACT

In an optical distance measuring device detecting a distance to an object, a light source is driven at a predetermined timing, and light from the light source is emitted to a predetermined range of a space, and reflected light corresponding to the emitted light is detected by at least one light receiving element. A detection signal corresponding to the reflected light is processed, and an SPAD calculation unit extracts a peak signal corresponding to the reflected light from an object. At this time, the distance to the object is measured according to the time from driving of the light source by an emission unit until output of a peak signal. At this time, performance for measurement of the distance to the object is changed depending on the state of the peak signal. This makes sensitivity appropriate when the distance to the object is optically detected.

14 Claims, 12 Drawing Sheets

EACH IN-BLOCK HISTOGRAM (AFTER FIRST EMISSION)

EACH IN-BLOCK HISTOGRAM (AFTER SECOND EMISSION)

EACH IN-BLOCK HISTOGRAM (AFTER THIRD EMISSION)

OPTICAL DISTANCE MEASURING DEVICE AND METHOD FOR THE SAME

CROSS-REFERENCE TO RELATED APPLICATION

This application is based on and claims the benefit of priority from earlier Japanese Patent Application No. 2018-108321 filed Jun. 6, 2018, the description of which is incorporated herein by reference.

BACKGROUND

Technical Field

The present disclosure relates to a technique for optically measuring a distance.

Related Art

In connection with operation of a vehicle, there recently has been a demand for a technique for measuring a distance to an object at high speed to allow for collision avoidance, autonomous operation, or the like. One of such techniques for optically measuring a distance involves measuring a distance by measuring the time from emission of laser light or the like until reflected light returns ("measuring a distance" is hereinafter also simply referred to as "distance measurement"). Detection of reflected light requires high responsiveness and excellent detection capability, and thus avalanche photodiodes (APDs) or PIN photodiodes are often used as light receiving elements.

When reflected light (photons) is incident on an APD, electrons and holes are generated, and the electrons and the holes are each accelerated in a high electric field, and the electron and the holes collide one after another and are ionized. Thus, new electron and hole pairs are generated (avalanche phenomenon). In this manner, the APD can amplify incidence of photons, and is thus often used in a case where reflected light has a reduced intensity as is the case with a far object. The APD has operation modes including a linear mode in which the APD is operated at a reverse bias voltage lower than a breakdown voltage and a Geiger mode in which the APD is operated at a reverse bias voltage equal to or higher than the breakdown voltage. In the linear mode, the numbers of electrons and holes exiting a high electric field area and disappearing are larger than the numbers of electrons and holes generated, and annihilation of the electron and hole pairs stops naturally. Thus, an output current from the APD is substantially proportional to the amount of incident light.

On the other hand, in the Geiger mode, incidence of even a single photon allows the avalanche phenomenon to be caused, enabling a further increase in detection sensitivity. Such an APD operated in the Geiger mode may be referred to as a single photon avalanche diode (SPAD). A known high-speed distance measuring device using SPADs emits light such as laser light toward an object, and detects reflected light at high sensitivity using the SPADs. By measuring the time from emission of laser until detection of reflected light, the distance to the object can be detected. This time is referred to as a Time of Flight (TOF).

DESCRIPTION OF SPECIFIC EMBODIMENTS

Figure 1:
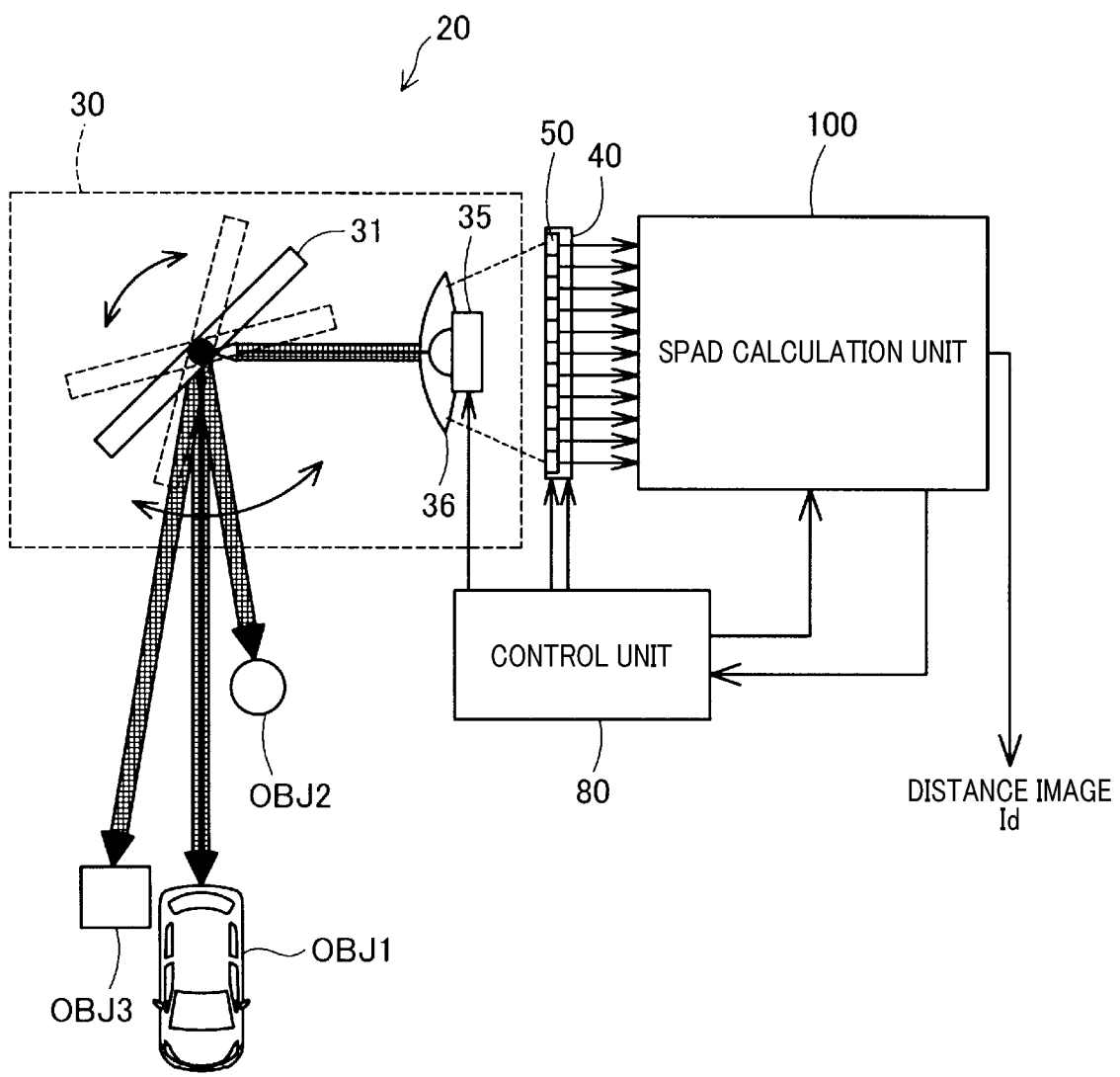
FIG. 1 is a schematic configuration diagram schematically illustrating a configuration of an optical distance measuring device of a first embodiment.

In the known optical distance measuring technique set forth above, as disclosed in JP-A-2014-77658, a light receiving surface is prepared on which light receiving elements such as SPADs are arranged in a two-dimensional array, and reflected light of laser light emitted toward the object is incident on the light receiving surface. The intensity, the S/N ratio, and the like of incident light significantly vary depending on conditions for distance measurement. In other words, reflected light has a relatively wide dynamic range. Thus, disadvantageously, laser elements emitting light and light receiving elements receiving reflected light have excessive or insufficient capabilities (for example, optical output and sensitivity) compared to performance required for distance measurement.

Excessive or insufficient performance affects not only the accuracy of distance measurement but also the lives of the laser elements and the length of detection time. For example, when the emission intensity of light from the laser elements is increased to obtain a sufficient reflected light intensity even from a far object, the lives of general laser elements are shorter than when the emission intensity is low. Alternatively, when the number of light receptions is increased to allow accurate distance measurement to be achieved with a low S/N ratio during one distance measurement, the S/N ratio is improved but the time required for distance measurement is increased.

To address these issues, one aspect of the present disclosure provides an optical distance measuring device for detecting a distance to an object. The optical distance measuring device includes an emission unit driving a light source at a predetermined timing to emit light from the light source to a predetermined range of a space, a light receiving unit including a light receiving element detecting reflected light corresponding to the emitted light, the light receiving unit outputting a detection signal corresponding to the reflected light detected, a signal processing unit processing the detection signal to extract a peak signal corresponding to the reflected light from the object, a measurement unit measuring a distance to the object according to a time from driving of the light source by the emission unit until the peak signal is extracted, and an adjustment unit outputting an adjustment signal changing performance for measurement of the distance to the object to at least one of the emission unit, the light receiving unit, and the signal processing unit, depending on a state of the peak signal output by the signal processing unit.

In the optical distance measuring device, the adjustment unit outputs, to at least one of the emission unit, the light receiving unit, and the signal processing unit, the adjustment signal changing the performance for measurement of the distance to the object depending on the state of the peak signal obtained by processing the detection signal output by the light receiving unit. Thus, the performance for distance measurement can be changed depending on the state of the detection signal. Consequently, the performance for distance measurement can be set to a desired state. Note that the contents of the present disclosure can also be implemented as an optical distance measuring method.

A. First Embodiment (1) General Configuration of Device as a Whole

Figure 2:
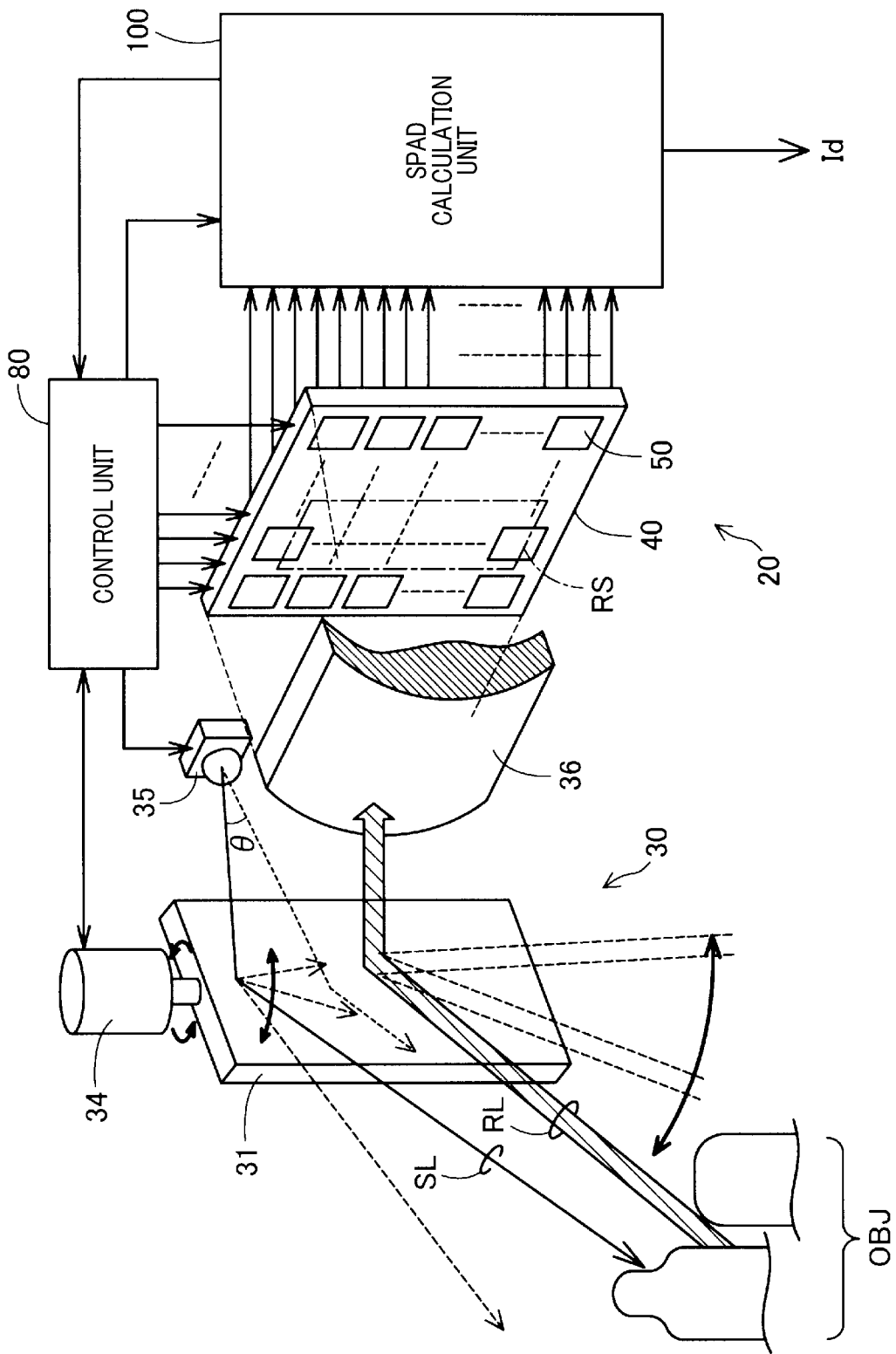
FIG. 2 is a descriptive diagram schematically illustrating an optical system of the optical distance measuring device of the first embodiment.

An optical distance measuring device 20 of a first embodiment includes an optical system 30 emitting laser light toward an object for distance measurement, a light receiving array 40 in which a plurality of light receiving elements 50 are arranged, an SPAD calculation unit 100 performing distance measurement calculation using an output from the light receiving array 40, and a control unit 80 controlling these components, as illustrated in FIG. 1 and FIG. 2. The object for distance measurement is assumed, in a case where the optical distance measuring device 20 is mounted to a vehicle, to be any of various objects such as another vehicle, a pedestrian, or an obstacle. FIG. 1 indicates the objects as reference signs OBJ1 to OBJ3, and FIG. 2 collectively indicates the object as reference sign OBJ.

The optical system 30 of the first embodiment includes a laser element 35 including an emission unit emitting light for distance measurement, the laser element 35 outputting laser light, a mirror 31 reflecting the laser light and changing the direction, a motor 34 rotating the mirror 31, a lens 36 focusing and guiding the reflected light from the object OBJ onto the light receiving array 40, and the like. Light emitted from the laser element 35 is drawn with a single line in FIG. 2 but actually spreads through an angle θ along a rotation axis direction of the mirror 31 (hereinafter referred to as the vertical direction for convenience). The mirror is rotated at high speed by the motor 34, and thus laser light emitted from the laser element 35 has a traveling direction changed according to the rotation angle of the mirror 31. As a result, the laser light performs scanning over a range corresponding to the spread or angular range of the laser light with respect to a direction (hereinafter referred to as the horizontal direction for convenience) perpendicular to the rotation axis of the motor 34. The mirror 31 is a surface reflection mirror including a reflection surface on only one surface and can perform, in principle, scanning through 180 degrees. However, the optical system 30 is housed in a case (not illustrated), and thus the scanning is limited by the width of an outlet for laser light, and scanning within a predetermined range can be achieved. The predetermined range of the space that can be scanned is determined by the configuration of the optical system 30 as described above. Note that the motor 34 includes a built-in origin detection sensor not illustrated, the origin detection sensor detecting the origin position of rotation, and that the control unit 80 can determine the current scan position in the predetermined range of the space being scanned, based on the timing of detection of the origin position of the motor 34 and the rotation speed of the motor 34.

When reflected by the object OBJ, laser SL emitted within the range in which the laser is reflected by the mirror 31 for distance measurement is typically randomly reflected by a surface of the object OBJ. Thus, part pf the laser SL returns in the direction of incidence. Reflected light returning in the direction of emitted light travels in a direction opposite to the direction of the emitted light, and is then reflected by the mirror 31 and enters the lens 36. The light is focused by the lens 36 and arrives on the light receiving array 40 to form an image RS shaped according to the width of emitted laser light and the vertical spread. The position of the image RS on the light receiving array 40 is determined by alignment of the optical system 30.

Light exiting from the laser element 35 reciprocates between the optical distance measuring device 20 and the object OBJ. However, the laser light undergoes the reciprocation in only a very short time, and thus even when the reflected light returns to the mirror 31, the rotation angle of the mirror 31 can be considered to remain unchanged. Consequently, as illustrated in FIG. 1, light reflected by the object OBJ returns through a path that is coaxial with an optical path from the laser element 35 to the object OBJ while following the path in the opposite direction. Thus, the optical system 30 as described above may be referred to as a coaxial optical system.

The light receiving array 40 includes a plurality of light receiving elements 50 in the vertical direction and in the horizontal direction as illustrated in FIG. 2. A range in which the light receiving elements 50 are arranged is referred to as a light receiving area. A signal from each of the light receiving elements 50 is treated as an image as described later, and thus the light receiving element 50 may be referred to as a pixel forming an image with a size corresponding to the light receiving array 40.

The mechanism of reflected light detection performed by the SPAD calculation unit 100 will be described using FIGS. 3 to 6B. The light receiving array 40 includes the light receiving elements 50 for H×V pixels arranged therein, and an image RS of reflected light is formed on the light receiving elements 50. The image RS is reflected light from an area scanned using laser light, and corresponds to reflected light from a range from one end to the other end of a scan target area sequentially reaching the light receiving elements 50 due to rotation of the mirror 31. Furthermore, given a particular scan position, the time required for reflected light from the object OBJ at a near position to reach the light receiving element 50 is shorter than the time required for reflected light from the object OBJ at a far position to reach the light receiving element 50. Consequently, at a particular scan position, the length of time required to detect reflected light allows determination of a distance to the object OBJ present at the scan position.

The light receiving element 50 uses an avalanche diode, and a configuration of the light receiving element 50 will be described later. When receiving reflected light, the light receiving element 50 outputs a pulse signal.

A pulse signal output from the light receiving element is input to the SPAD calculation unit 100. The SPAD calculation unit 100 corresponds to a signal processing unit and a measurement unit, and measures the distance to the object OBJ based on the time from emission of light from the laser element 35 until reception of a pulse signal. Reflected light to be detected by the light receiving array 40 is treated as being incident on all the light receiving elements 50 corresponding to H×V pixels. However, reflected light may be incident on a particular range determined by settings made by the optical system 30.

Figure 4:
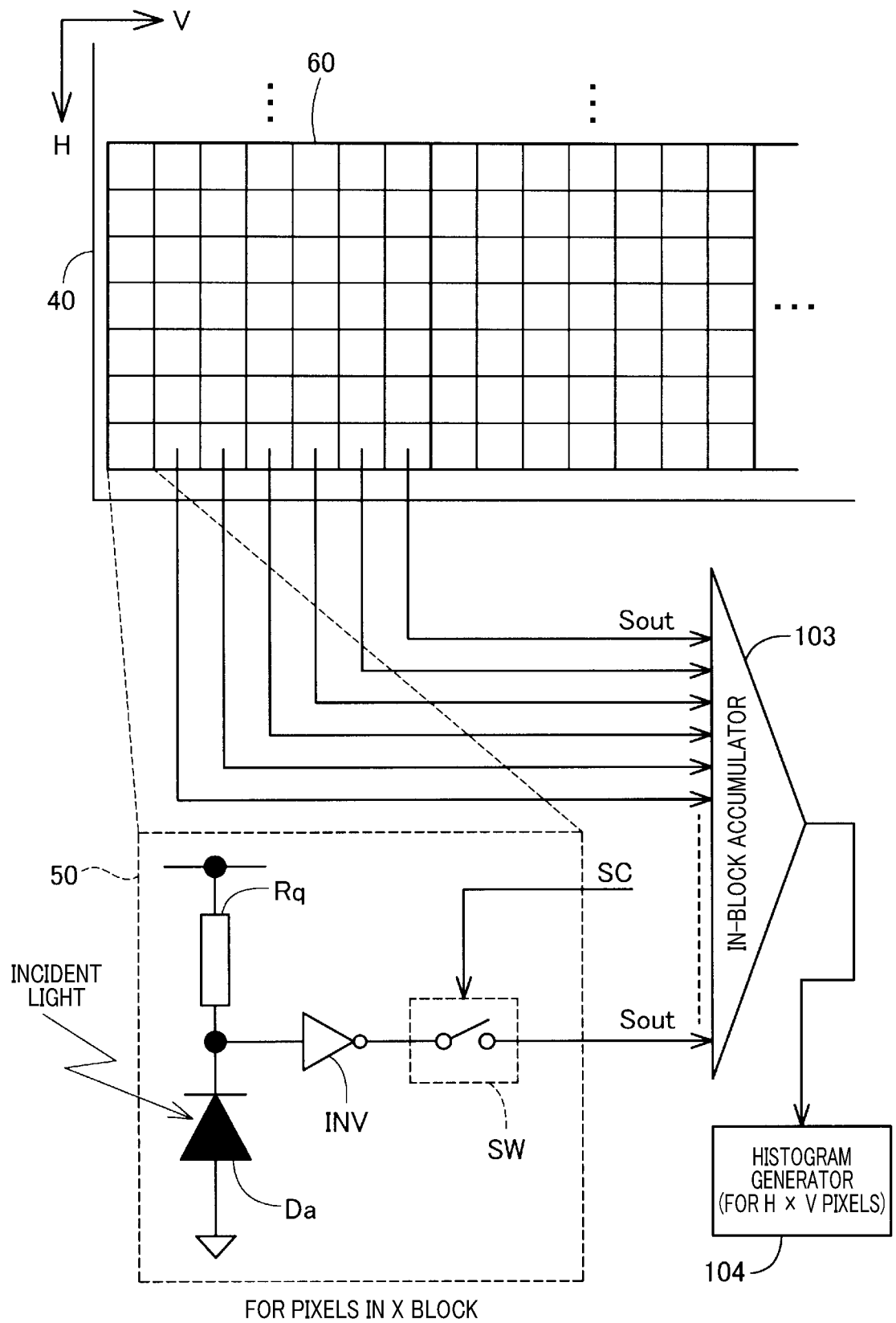
FIG. 4 is a descriptive diagram illustrating processing of a detection signal detected by a light receiving element of the first embodiment.

FIG. 4 illustrates an equivalent circuit of each light receiving element 50. As illustrated in FIG. 4, each light receiving element 50 connects a quench resistor Rq and an avalanche diode Da in series between a power supply Vcc and a ground line, and inputs the voltage at a connection point between the quench resistor Rq and the avalanche diode Da, to an inverting element INV corresponding to one of the logical operation elements to convert the voltage into a digital signal with an inverted voltage level. An output of the inverting element INV is connected to one input of an AND circuit SW, and is thus externally output to the outside without change in a case where the other input is at a high level H. The state of the other input of the AND circuit SW can be switched by a selection signal SC. The selection signal SC is used to specify from which of the light receiving elements 50 in the light receiving array 40 a signal is to be read out and may thus be referred to as an address signal. Note that, instead of the AND circuit SW, an analog switch may be used in a case where, for example, the avalanche diode Da is used in the linear mode, with an output from the avalanche diode Da directly used as an analog signal.

In a case where no light is incident on the light receiving elements 50, the avalanche diode Da remains electrically non-conducting. Thus, an input side of the inverting element INV remains pulled up via the quench resistor Rq, in other words, remains at a high level H. Consequently, the output of the inverting element INV remains at a low level L. When external light is incident on each of the light receiving elements 50, the incident light (photons) makes the avalanche diode Da electrically conducting. As a result, a large current flows through the quench resistor Rq, the input side the inverting element INV is temporarily set to the low level L, whereas the output of the inverting element INV is inverted to the high level H. As a result of the large current flowing via the quench resistor Rq, a voltage applied to the avalanche diode Da decreases to stop supply of power to the avalanche diode Da, which is made electrically non-conducting again. As a result, the output signal from the inverting element INV is inverted back to the low level L. As a result, when light (photons) is incident on each light receiving element 50, the light receiving element 50 outputs a pulse signal that is at the high level for only a very short time. Thus, by setting the address signal SC to the high level H in synchronism with the timing when each light receiving element 50 receives light, an output signal from the AND circuit SW, that is, an output signal Sout from each light receiving element 50 reflects the state of the avalanche diode Da.

Each of the light receiving element 50 described above is configured to operate in the Geiger mode, and can thus detect reflected light as long as only one photon is incident on the light receiving element. However, light returning toward the mirror 31 of the optical system 30 is limited to a small portion of light randomly reflected by the surface of the object OBJ. Thus, even in a case where the object OBJ is present in the direction of scanning by laser light, reflected light is not necessarily detected for one pulse emitted from the laser element 35. Consequently, detection of reflected light by the light receiving element 50 is stochastic. The SPAD calculation unit 100 uses the output signal Sout from the light receiving element 50, which can only stochastically detect reflected light, to execute statistical processing on the output signal Sout to detect the reflected light.

As illustrated in FIG. 4, the light receiving array 40 of the first embodiment organizes H×V light receiving elements 50 into light receiving blocks 60 each of 7×7 light receiving elements 50. Each block may include any plural number of light receiving elements 50. Additionally, for the numbers of light receiving elements 50 in the vertical direction and in the horizontal direction, a plurality of light receiving elements 50 may be provided in at least one of the directions.

Figure 3:
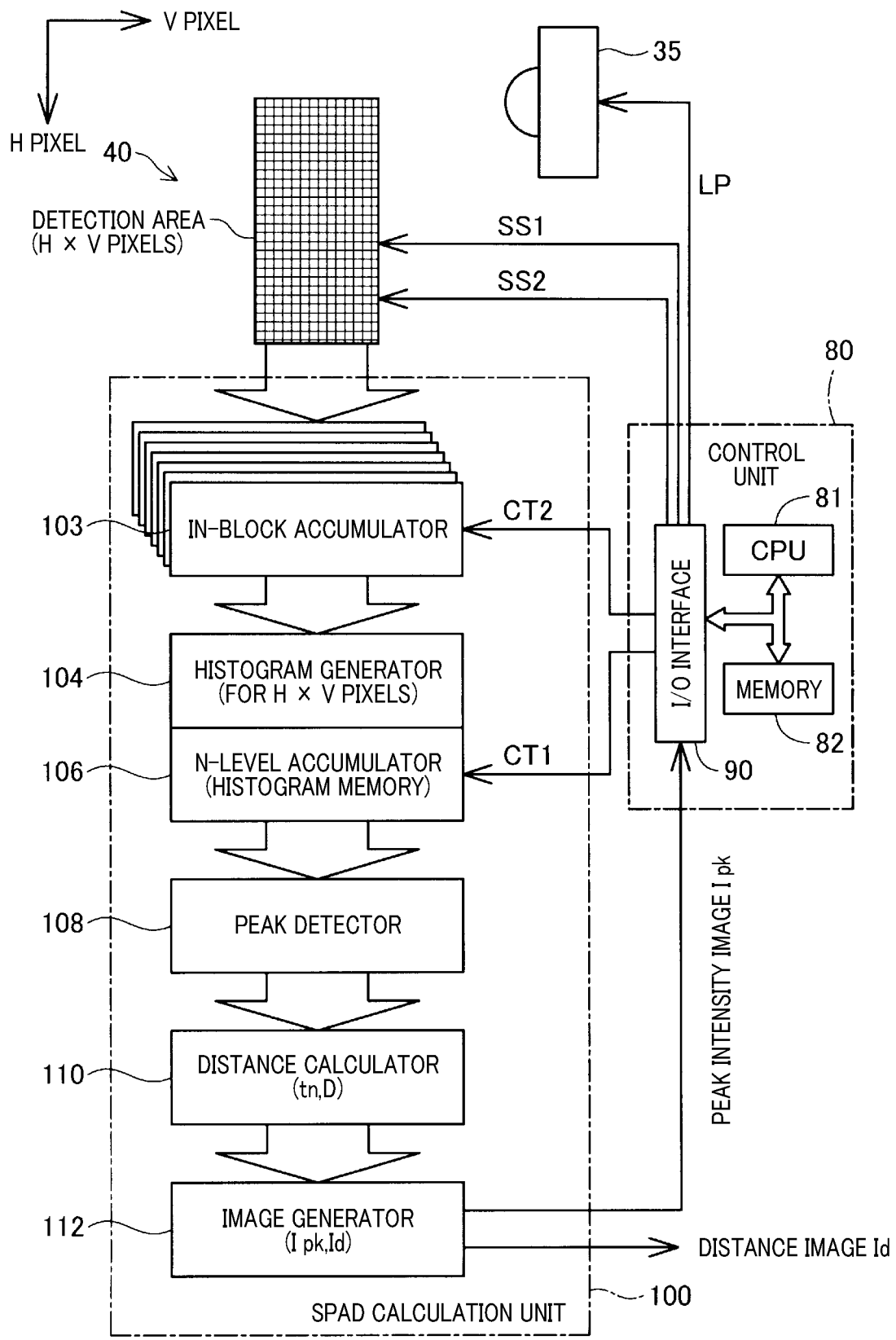
FIG. 3 is a functional block diagram focused on a SPAD calculation unit of the optical distance measuring device of the first embodiment.

The output signals Sout from the light receiving elements 50 belonging to each of the light receiving blocks 60 in the light receiving array 40 are input to the SPAD calculation unit 100. As illustrated in FIG. 3, the SPAD calculation unit 100 includes an in-block accumulator 103, a histogram generator 104, an N-level accumulator 106, a peak detector 108, a distance calculator 110, and an image generator 112.

As many in-block accumulators 103 as the light receiving blocks 60 in the light receiving array 40 are provided. In the present embodiment, the output signals Sout from the 7×7 light receiving elements 50 are input to the corresponding in-block accumulator 103. Each of the in-block accumulators 103 accumulates the output signals Sout received from the plurality of light receiving elements 50. Results of the accumulating operations by the in-block accumulators 103 are input to the histogram generator 104 and further accumulated in the N-level accumulator 106. The histogram generator 104 generates a histogram corresponding to each block for each emission from the laser element 35. The N-level accumulator 106 accumulates the most recent N histograms generated by the histogram generator 104 and stores an accumulation result in a histogram memory.

Figure 5A:
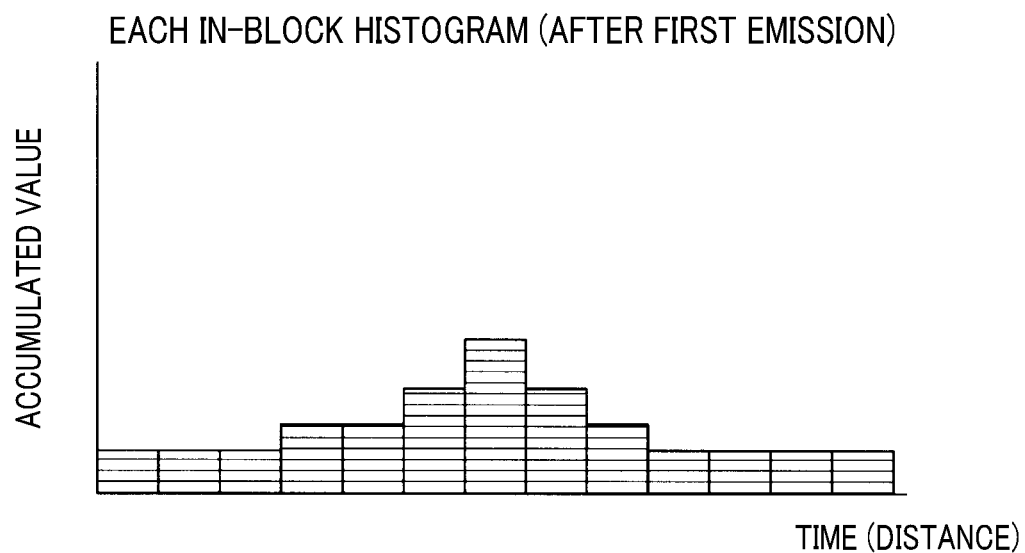
FIG. 5A is a descriptive diagram illustrating an example of a histogram obtained after the first emission.
Figure 5B:
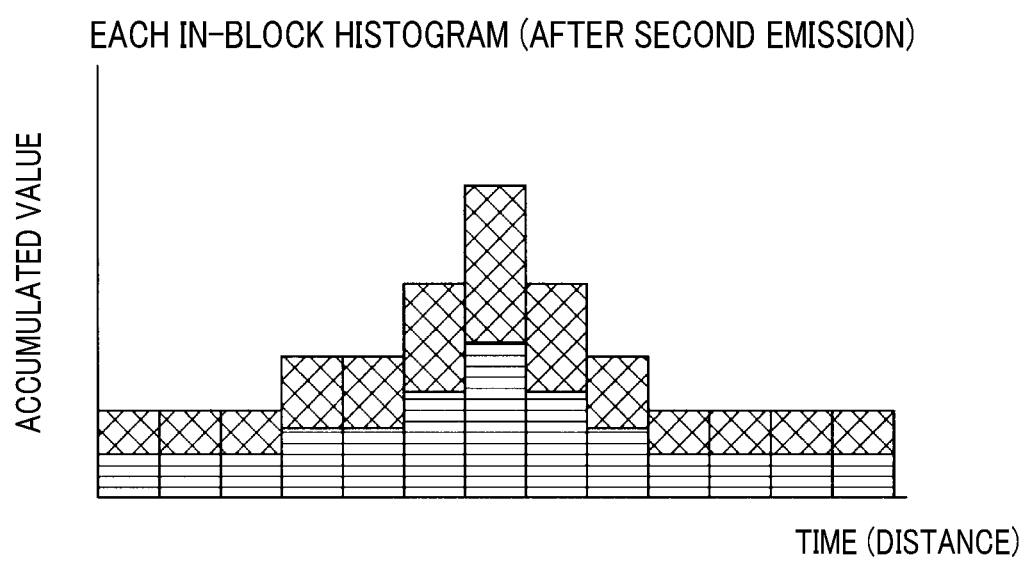
FIG. 5B is a descriptive diagram illustrating an example of a histogram obtained after the second emission.
Figure 5C:
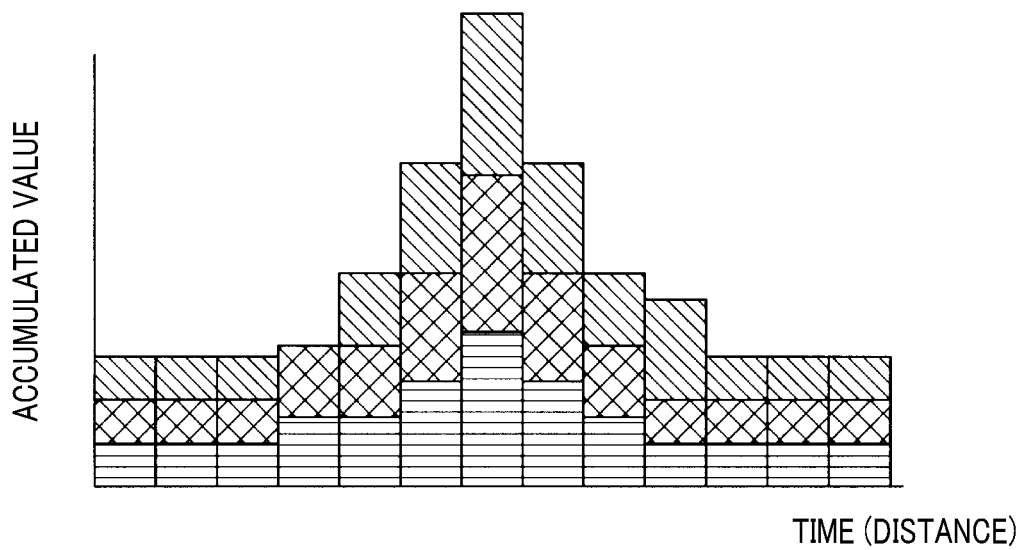
FIG. 5C is a descriptive diagram illustrating an example of a histogram obtained after the third emission.

FIGS. 5A to 5C illustrate an example of the histogram. FIG. 5A illustrates a histogram obtained by the in-block accumulator 103 by accumulating the output signals from the plurality of light receiving elements 50 in one light receiving block 60 in association with one emission from the laser element 35. The output signals Sout from the 7×7 light receiving elements 50 included in one light receiving block 60 are detected at a certain timing on a time axis. At the same timing, reflected light incident on the light receiving block 60 is detected at each light receiving element 50, and the timing corresponding to the position of the object OBJ having generated the reflected light corresponds to a peak. However, variation occurs due to the effect of noise and the like.

Figure 6A:
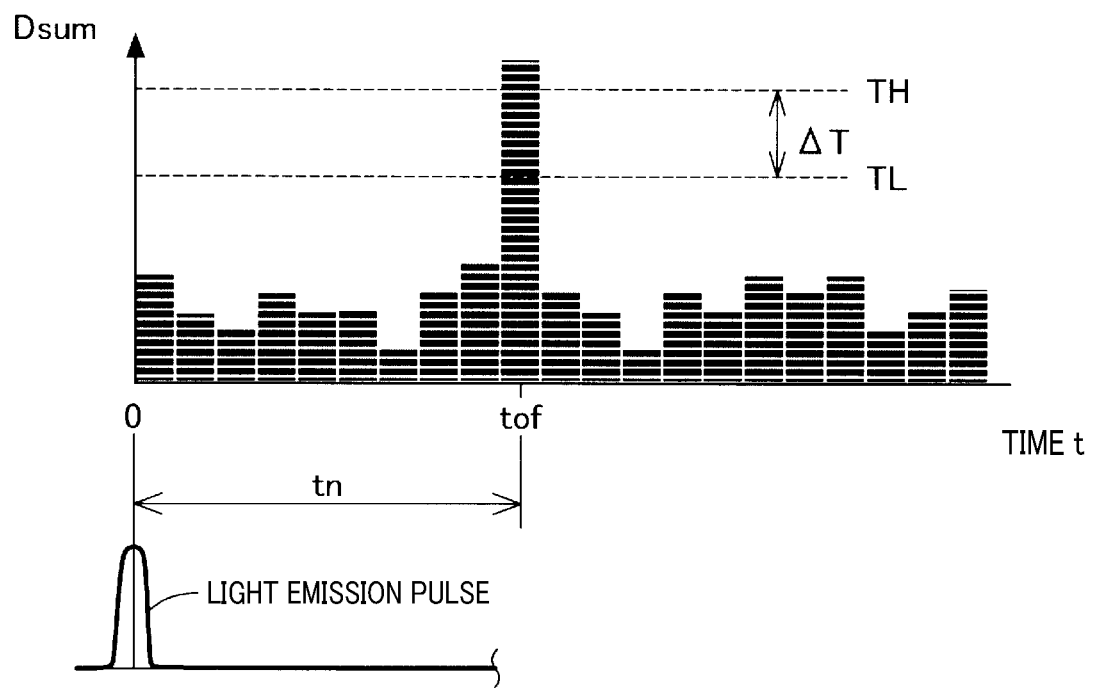
FIG. 6A is a descriptive diagram illustrating an example of a cumulative histogram during distance measurement.

In the present embodiment, such generation of histograms is performed N times, and the N-level accumulator 106 accumulates the results. FIG. 5B illustrates a histogram resulting from the second emission and light reception, and FIG. 5C illustrates a histogram resulting from the third emission and light reception. The histograms thus accumulated are referred to as a cumulative histogram Dsum. With N detection results accumulated, pulse signals resulting from external light are randomly generated, whereas pulse signals based on reflected light from a particular site are generated at a particular timing. Thus, a peak appears in the cumulative histogram Dsum. FIG. 6A illustrates an example of the cumulative histogram Dsum. FIG. 6A indicates that N detection results accumulated lead to a peak PK at a time tof. The magnitude of the peak PK has an appropriate range. FIG. 6A illustrates an upper limit value TH and a lower limit value TL of the appropriate range. The difference between the upper limit value TH and a lower limit value TL is denoted as $\Delta T$. Control for setting the cumulative histogram Dsum at the peak PK within the appropriate range will be described later in detail.

Figure 6B:
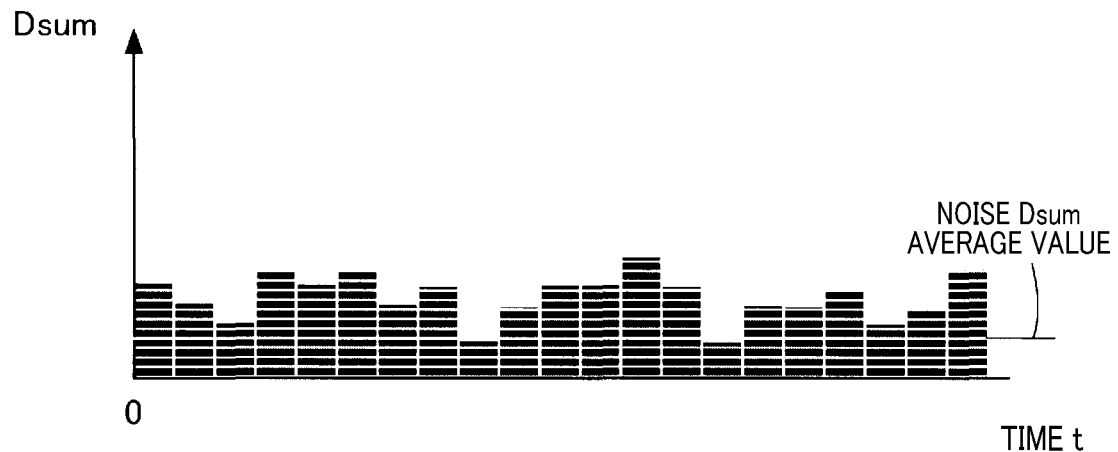
FIG. 6B is a descriptive diagram illustrating an example of a cumulative histogram corresponding to external light that is noise.

Additionally, it is understood from FIG. 6A that the cumulative histogram Dsum is generated at a timing other than the peak PK. Histograms other than the peak PK result from detection of noise such as external light. FIG. 6B illustrates detection performed by the histogram generator 104 in a case where no object OBJ is present in front of the optical distance measuring device 20, leading to no peak PK being obtained. A noise Dsum average value corresponding to an average value for the cumulative histogram Dsum in this case can be determined. The utilization of the noise Dsum average value will be described later in detail.

Detection of photons may fail to be achieved during one detection, and by accumulating detections of the reflected light peak for N emissions of the laser light pulse, that is, executing statistical processing for determining the cumulative histogram Dsum, reflected light from the object OBJ can be accurately detected. As illustrated in FIG. 6A, the time to from a light emission pulse from the laser element 35 until the peak is the time required for light emitted from the laser element 35 to get to the object OBJ and back, and thus the distance to the object OBJ can be determined from the time tn. The peak detector 108 reads the cumulative histogram Dsum, corresponding to the result of accumulation by the N-level accumulator 106, to extract the peak for each light receiving block 60 and output the peak as a peak signal. The in-block accumulator 103, histogram generator 104, N-level accumulator 106, and peak detector 108 described above function as a signal processing unit.

The peak signal extracted by the peak detector 108 is output to the distance calculator 110. The distance calculator 110 uses the time tn of the peak signal to detect the distance D to the object OBJ. The image generator 112 uses a calculation result from the distance calculator 110 to generate a peak intensity image Ipk and a distance image Id. The distance calculator 110 and the image generator 112 function as a measurement unit.

The image generator 112 outputs the peak intensity image Ipk and distance image Id generated to the outside. The peak intensity image Ipk is an image obtained by plotting the magnitude (intensity) of the peak detected by the peak detector 108 within the predetermined range scanned by the optical system 30, and the image generator 112 outputs an image signal corresponding to the peak intensity image Ipk. The peak intensity image Ipk is output to the control unit 80. Additionally, the distance image Id is an image obtained by plotting the distance D determined by the distance calculator 110 within the predetermined range scanned by the optical system 30, and the image generator 112 outputs, to the outside, an image signal corresponding to the distance image Id. Outside equipment uses the distance image Id to determine the distance to the object OBJ in front of the vehicle and utilizes the distance to control obstacle avoidance and the like.

The control unit 80 receiving the peak intensity image Ipk from the SPAD calculation unit 100 will be described. The control unit 80 includes a CPU 81 responsible for general processing, a memory 82 storing programs executed by the CPU 81 and data for calculation, or calculation results, and an I/O interface 90 outputting and receiving signals to and from the outside equipment, and the like. The CPU 81, the memory 82, the I/O interface 90, and the like are connected together by a bus and exchange data with one another. As an input signal, the peak intensity image Ipk from the image generator 112 is input to the I/O interface 90. Additionally, the I/O interface 90 outputs output signals such as an adjustment signal CT1 for the N-level accumulator 106, an adjustment signal CT2 for the in-block accumulator 103, sensitivity adjustment signals SS1 and SS2 for the light receiving array 40, and an output adjustment signal LP for the laser element 35.

Among the signals, the adjustment signal CT1 is a signal defining the number of accumulating operations N to be performed by the N-level accumulator 106. The control unit 80 executes processing described later to determine the appropriate number of accumulating operations N to be performed by the N-level accumulator 106 with which the peak PK is placed between the upper limit value TH and the lower limit value TL, and indicates the number of accumulating operations N to the N-level accumulator 106 through the adjustment signal CT1. Additionally, the control unit 80 uses the sensitivity adjustment signal SS1 to adjust the sensitivity of the light receiving elements 50 in the light receiving array 40, and uses the output adjustment signal LP to adjust the output intensity of the laser element 35. Furthermore, the control unit 80 uses the adjustment signal CT2 to adjust the number of pixels accumulated in the in-block accumulator 103 or uses the sensitivity adjustment signal SS2 to adjust the number of light receiving elements 50 detecting reflected light within the light receiving block 60. For the five types of signals, any one of the signals may be used, a combination of any two signals may be used, or all of the five signals may be used. Alternatively, a combination with any other signal may be used.

(2) Sensitivity Adjustment Processing

Figure 7:
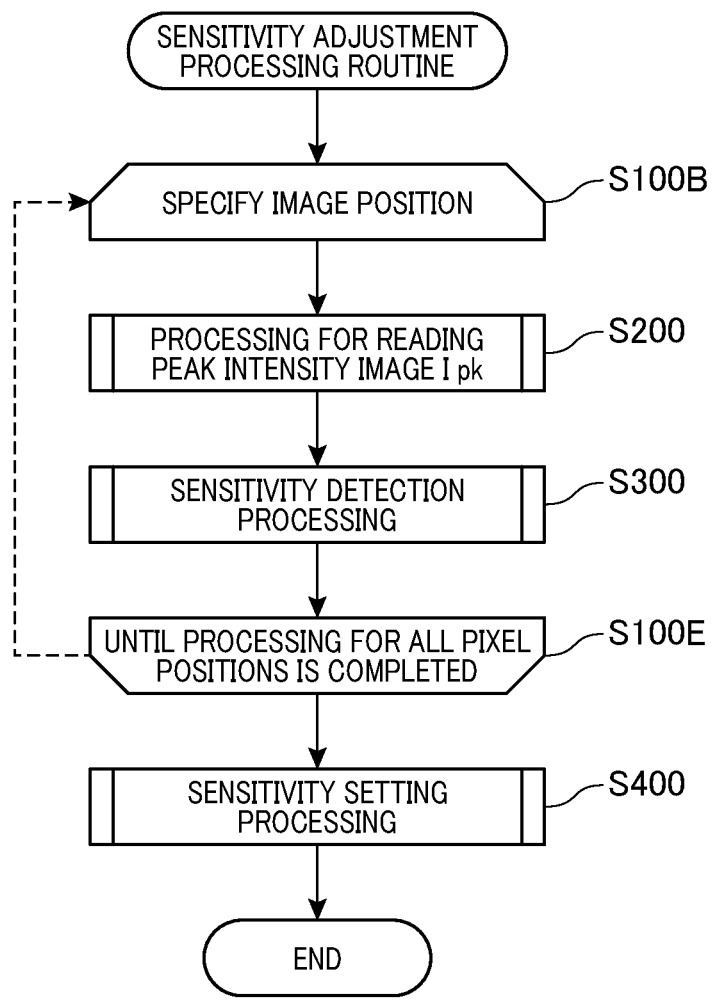
FIG. 7 is a flowchart illustrating a sensitivity adjustment processing routine in the optical distance measuring device of the first embodiment.
Figure 8:
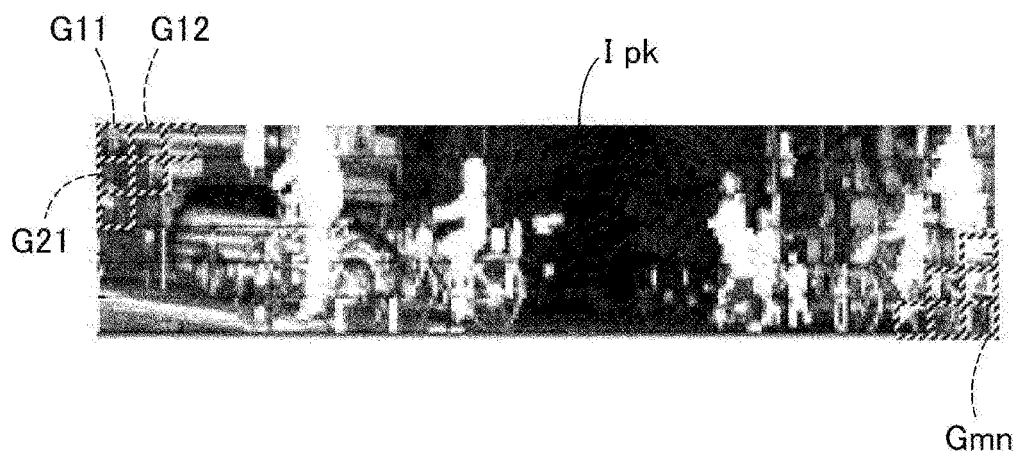
FIG. 8 is a descriptive diagram illustrating an example of a peak intensity image.

Based on the hardware configuration described above, sensitivity adjustment processing executed by the optical distance measuring device 20 will be described using FIG. 7. When the optical distance measuring device 20 is activated, a sensitivity adjustment processing routine illustrated in FIG. 7 performs required initialization processing and is then repeatedly executed while performing distance measurement. The distance measurement is performed by causing the laser element 35 to emit light, using the light receiving elements 50 in the light receiving array 40 to detect reflected light from the object, and determining the distance to the object based on the time until the detection. The distance measurement processing is performed, while the sensitivity adjustment processing routine illustrated in FIG. 7 is executed. When the sensitivity adjustment processing routine is invoked, first, an image position is specified (step S100B). Specification of the image position refers to specifying a read position in the peak intensity image Ipk obtained by driving the optical system 30 to scan the predetermined space. FIG. 8 illustrates an example of the peak intensity image Ipk. The processing is sequentially executed starting with a head (upper left of the figure) of the peak intensity image Ipk. In an example in FIG. 8, specification of the image position proceeds from an image position G11 in the upper left of the image and first through image positions G21, G31, . . . in the vertical direction (with respect to the vehicle), and once the specification in the vertical direction is completed, moves in the lateral direction (horizontal direction with respect to the vehicle) and repeats the specification again starting with an image position G12.

Once the specification of the image positions is performed, then processing for reading the peak intensity image Ipk from the image generator 112 (step S200) and sensitivity detection processing (step S300) are executed, and then whether processing is completed for all the image positions is determined (step S100E). In a case where processing is not completed for all the image positions, the processing returns to step S100B and is repeated. Thus, until the processing is completed for all the image positions, steps S200 and S300 described above are repeated.

The peak intensity image Ipk reading processing (step S200) in the first embodiment is processing for reading the data at the specified image position from the peak intensity image Ipk output by the image generator 112, and the sensitivity detection processing (step S300) is processing for determining, based on the data, a total sensitivity including the optical system 30 and the SPAD calculation unit 100. The total sensitivity including the optical system 30 and the SPAD calculation unit 100 can specifically be determined based on the cumulative histogram Dsum for the peak PK illustrated in FIG. 6A or the average value for the cumulative histogram Dsum including noise illustrated in FIG. 6B.

Various sensitivities can be defined, but the sensitivity of a signal to be retrieved can be defined as an S value corresponding to the magnitude of the signal itself, as in Equation (1).

$$S \text{ value} = (Spk + Npk) - Nav \quad (1)$$

Here, (Spk+Npk) corresponds to the cumulative histogram Dsum for the peak PK illustrated in FIG. 6A. Spk is a true cumulative histogram at the peak, and Npk is a cumulative histogram including noise components at the peak. The histograms are accumulated because the peak PK illustrated in FIG. 6A also includes noise components. Additionally, Nav in Equation (1) is the average value for the cumulative histogram Dsum for noise as illustrated in FIG. 6B. Equation (1) allows the magnitude S of the signal to be retrieved to be determined.

Alternatively, a definition can be provided as in Equation (2).

$$S/N \text{ value} = \{(Spk + Npk) - Nav\} / \sqrt{V(Nav)} \quad (2)$$

The S/N value represents, instead of the intensity of the signal itself, what degree of difference from the noise is present. The S value, the S/N value, or the like as described above can be used as the sensitivity.

Consequently, the processing for reading the peak intensity image Ipk (step S200) and the sensitivity detection processing (step S300) are executed for all the image positions to determine the sensitivity at all the image positions G11, G21, . . . Gmn as described above, and the results are stored in the memory 82. The thus determined sensitivities are used to execute sensitivity setting processing (step S400).

Figure 9:
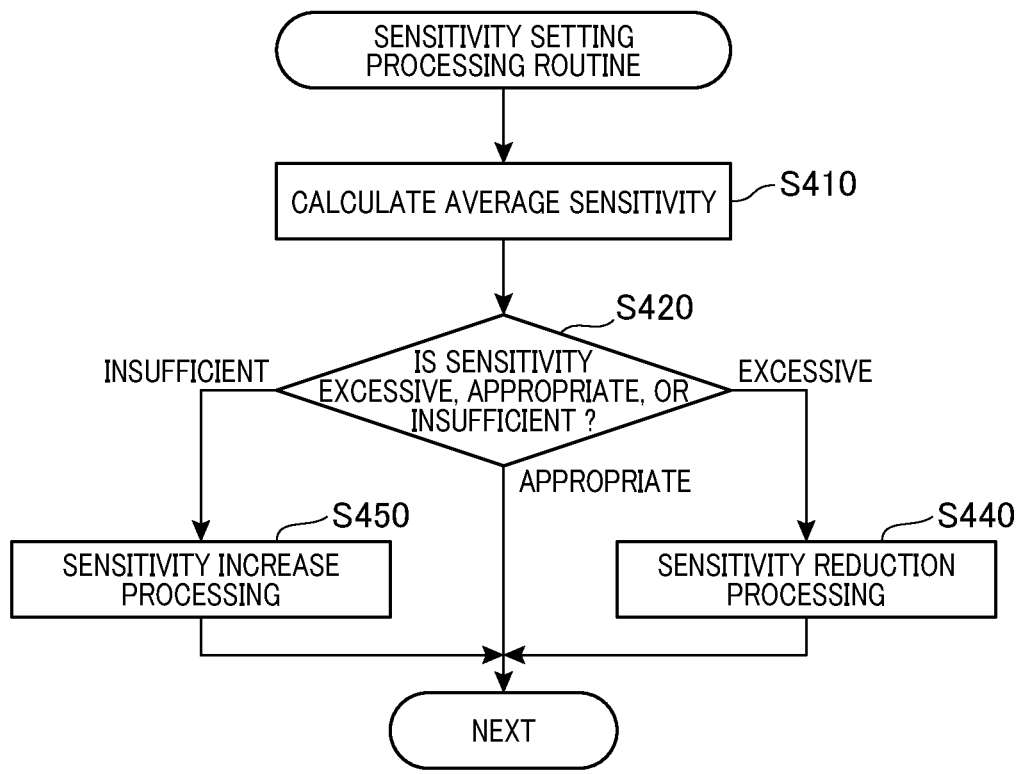
FIG. 9 is a flowchart illustrating a sensitivity setting processing routine in the first embodiment.

The sensitivity setting processing (step S400) will be described later in detail using a flowchart in FIG. 9. In the sensitivity setting processing, first, processing is executed in which the sensitivities determined in step S200 and stored in the memory 82 are read out and in which the average sensitivity is calculated (step S410). Whether the thus determined average sensitivity is excessive, appropriate, or insufficient is determined (step S420). Excessive sensitivity means that the sensitivity is such that the cumulative histogram Dsum exceeds the upper limit value TH as illustrated in FIG. 6A. Additionally, the appropriate sensitivity means that the sensitivity is such that the cumulative histogram Dsum is between the upper limit value TH and the lower limit value TL. Insufficient sensitivity means that the cumulative histogram Dsum is lower than the lower limit value TL as illustrated in FIG. 6A.

Thus, for excessive sensitivity, processing for reducing the sensitivity (step S440) is executed. On the other hand, for insufficient sensitivity, processing for increasing the sensitivity (step S450) is executed. The processing for reducing and increasing the sensitivity will be collectively described later. After the above-described sensitivity setting processing routine is ended, the sensitivity adjustment processing routine illustrated in FIG. 7 is temporarily ended.

In the first embodiment, sensitivity increase processing (step S450) and the sensitivity reduction processing (step S440) can be implemented by the control unit 80 using at least one of the output adjustment signal LP output to the laser element 35, the sensitivity adjustment signals SS1 and SS2 output to the light receiving array 40, and adjustment signals CT1 and CT2 output to the SPAD calculation unit 100. The adjustment signal CT1 is output to the N-level accumulator 106, and the adjustment signal CT2 is output to the in-block accumulator 103. The control unit 80 may output all the signals or any one of the signals or a combination of any plurality of signals.

[1] The output adjustment signal LP increases or reduces the output of the laser element 35. The output of the laser element 35 can be easily increased or reduced by increasing or reducing a voltage or a current to be applied to the laser element 35. An increase or reduction in the output of the laser element 35 increases or reduces the intensity of reflected light, enabling an increase or reduction in the total sensitivity from the optical system 30 to the SPAD calculation unit 100. Note that the output of the laser element 35 can be increased or reduced using a light emission time. The light emission time of the laser element 35 can be increased or reduced using the width of a drive pulse applied to the laser element 35.

In a case where the output of the laser element 35 is increased or reduced to set the appropriate sensitivity and where the detection sensitivity is insufficient, the detection sensitivity is increased to the appropriate level to enable a wider range of distance measurement and an increase in distance measurement accuracy. Additionally, in a case where the detection sensitivity is excessive, the output of the laser element 35 is reduced to enable suppression of a rise in the temperature of the laser element 35, while allowing extension of the life of the laser element 35. These factors allow the durability and reliability of the laser element 35 to be improved. As a result, the durability and reliability of the optical distance measuring device 20 as a whole can be improved.

[2] The sensitivity adjustment signal SS1 is used to increase or reduce the detection sensitivity of each of the light receiving elements 50 in the light receiving array 40. As illustrated in FIG. 4, in the present embodiment, the avalanche diode Da is used as each light receiving element 50, and thus the sensitivity of each light receiving element 50 can be increased or reduced by increasing or reducing the voltage applied to the avalanche diode Da via the quench resistor Rq.

In a case where the detection sensitivity of each light receiving element 50 is set and where the detection sensitivity is insufficient, the detection sensitivity is increased to the appropriate level to enable widening of the range of distance measurement and an increase in distance measurement accuracy. Additionally, in a case where the detection sensitivity is excessive, the voltage applied to the avalanche diode Da of each light receiving element 50 is reduced to enable suppression of a rise in the temperature of each light receiving element 50, while allowing extension of the life of the avalanche diode Da and the like. These factors allow the durability and reliability of each light receiving element 50 and thus the light receiving array 40 to be improved. As a result, the durability and reliability of the optical distance measuring device 20 as a whole can be improved.

Figure 10:
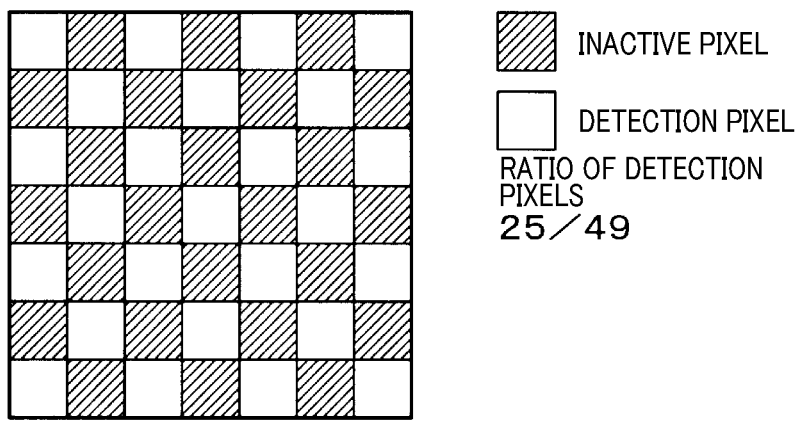
FIG. 10 is a descriptive diagram illustrating an example of detection pixels and inactive pixels in a light receiving block.
Figure 11:
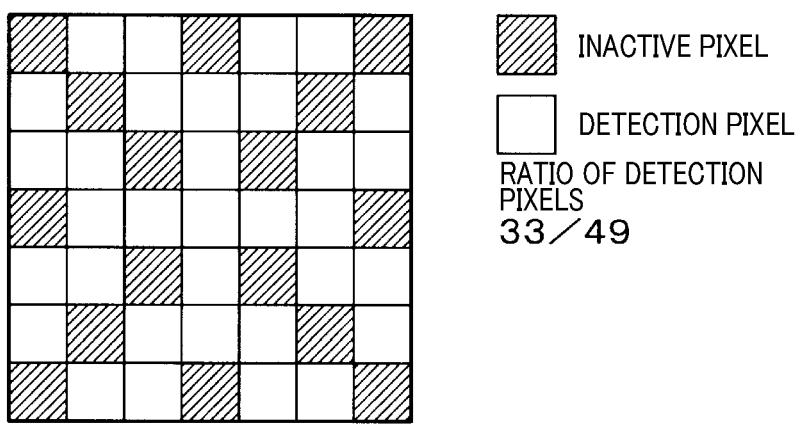
FIG. 11 is a descriptive diagram illustrating another example of detection pixels and inactive pixels in a light receiving block.

[3] In a sensitivity adjusting method utilizing the sensitivity adjustment signal SS2, the number of detection pixels in each of the light receiving blocks 60 in the light receiving array 40 is increased or reduced. In each light receiving block 60, 7×7=49 light receiving elements 50 are present. By default, 25 light receiving elements 50 alternately arranged in a staggered manner are used to determine the cumulative histogram Dsum as illustrated in FIG. 10. In FIG. 10, hatched pixels are inactive pixels not detecting reflected light. In a case where the light receiving block 60 has an insufficient detection sensitivity, the control unit 80 uses the sensitivity adjustment signal SS2 to reduce the number of inactive pixels in each light receiving block 60 to increase the number of detection pixels. For example, in a case where the detection pixels are in the default state illustrated in FIG. 10, the ratio of the detection pixels can be increased to 33/49 as illustrated in FIG. 11.

Figure 12:
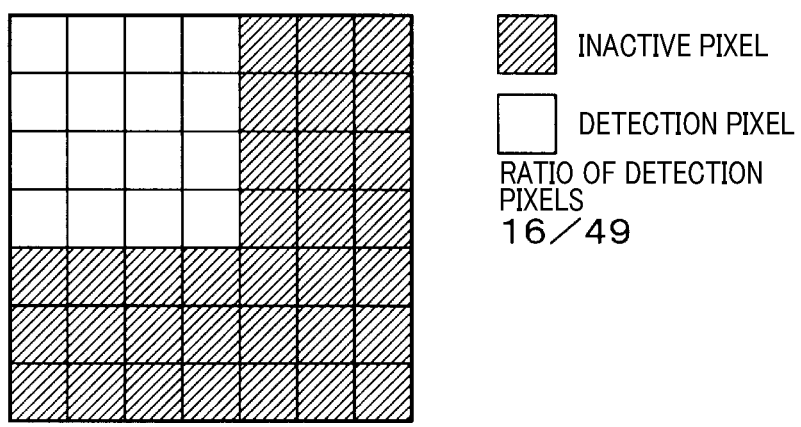
FIG. 12 is a descriptive diagram illustrating another example of detection pixels and inactive pixels in a light receiving block.

On the other hand, in a case where the detection accuracy is excessive, the sensitivity adjustment signal SS2 is used to reduce the number of detection pixels to increase the number of inactive pixels. For example, in an example illustrated in FIG. 11, the inactive pixels and the detection pixels are changed to one another to set the ratio of the detection pixels to 16/33. Of course, the sensitivity may be increased or reduced in units of pixels. Additionally, for an increased or a reduced number of detection pixels, the arrangement of the detection pixels (thus the inactive pixels) may be determined to have high symmetricity and to be well-balanced in the entire light receiving block 60 or sequentially increase or reduce the number of detection pixels from an end of the light receiving block 60. FIG. 12 illustrates an example in which the detection pixels are used starting with the end of the light receiving block. In an example illustrated in FIG. 12, the ratio of the detection pixels is 16/49. To make the detection pixels inactive, the voltage applied to the avalanche diode Da used as each light receiving element 50 is set to a value 0.

As described above, when the sensitivity is set by using the sensitivity adjustment signal SS2 to increase or reduce the number of detection pixels in each light receiving block 60, the time required for accumulation can be kept constant. Additionally, in a case where the sensitivity is excessive, a reduced number of detection pixels enables not only a reduction in power consumption but also extension of the life of the avalanche diode Da and the like. These factors allow the durability and reliability of each light receiving element 50 and thus the light receiving array 40 to be improved. As a result, the durability and reliability of the optical distance measuring device 20 as a whole can be improved.

[4] The adjustment signal CT1 is used to increase or reduce the number of accumulating operations to be performed by the N-level accumulator 106. As illustrated in FIGS. 5A to 5C and FIG. 6A.

As illustrate in FIGS. 5A to 5C and FIG. 6A, the peak PK is determined by accumulating N detections of reflected light at the same position, and thus an increase or reduction in the number N of accumulating operations (=the number of histograms accumulated) enables an increase or reduction in the total sensitivity from the optical system 30 to the SPAD calculation unit 100.

Note that a change in the number N of accumulating operations may be implemented by simply increasing or reducing the number N of accumulating operations with the optical system 30 kept operating but that in a case where a certain period is not involved in accumulation, the optical system 30 may be inactive during the period. Stopping the optical system 30 can be implemented by making light emission from the laser element 35 inactive or setting the voltage applied to the avalanche diode Da to the value 0.

In a case where the number N of accumulating operations is increased or reduced to set the appropriate sensitivity and where the detection sensitivity is insufficient, the number N of layering is increased to increase the detection sensitivity to the appropriate level, enabling a wider range of distance measurement and an increase in distance measurement accuracy.

Additionally, in a case where the detection sensitivity is excessive, the number N of accumulating operations is reduced, and thus during that period, the laser element 35 and the light receiving element 50 can be made inactive. This enables suppression of a rise in the temperature of the laser element 35 or the light receiving element 50, while allowing extension of the lives of the laser element 35 and the avalanche diode Da. These factors allow the durability and reliability of the laser element 35 and the light receiving element 50 to be improved. As a result, the durability and reliability of the optical distance measuring device 20 as a whole can be improved

[5] In a sensitivity adjusting method utilizing the adjustment signal CT2, the number of accumulation target pixels (light receiving elements 50) in the in-block accumulator 103 is increased or reduced. In the setting of the sensitivity using the sensitivity adjustment signal SS2 as described above, the number of detection pixels is changed, the detection pixels detecting reflected light in each of the light receiving blocks 60 in the light receiving array 40. However, with the number of detection pixels detecting reflected light kept constant, in other words, the number of light receiving elements 50 kept constant, the number of accumulation target light receiving elements 50 in the in-block accumulator 103 may be changed. The accumulation target light receiving elements 50 may be determined as appropriate as illustrated in FIGS. 10 to 12.

In the first embodiment described above, distance measurement can be performed using the optical system 30 and the SPAD calculation unit 100, while the detection sensitivity can be determined based on the peak intensity image Ipk and adjusted within the appropriate range. The sensitivity can be set by at least one of using the output adjustment signal LP to increase or reduce the output of the laser element 35, using the sensitivity adjustment signal SS1 to increase or reduce the detection sensitivity of each light receiving element 50, and using the adjustment signal CT1 to increase or reduce the number N of accumulating operations in the N-level accumulator 106. This allows the sensitivity to be appropriately set, not only enabling a wider range of distance measurement and an increase in distance measurement accuracy but also enabling improvement of the durability and reliability of the optical distance measuring device 20 as a whole.

Additionally, the sensitivity can be set by utilizing the inclusion of a plurality of the light receiving elements 50 in each light receiving block 60. In other words, the sensitivity can be set by using at least one of using the sensitivity adjustment signal SS2 to increase or reduce the number of light receiving elements 50 detecting reflected light in each light receiving block 60 and using the adjustment signal CT2 to increase or reduce in the number of accumulation target detection pixels in the in-block accumulator 103. This allows the sensitivity to be appropriately set, not only enabling a wider range of distance measurement and an increase in distance measurement accuracy but also enabling improvement of the durability and reliability of the optical distance measuring device 20 as a whole.

B. Second Embodiment

Figure 13:
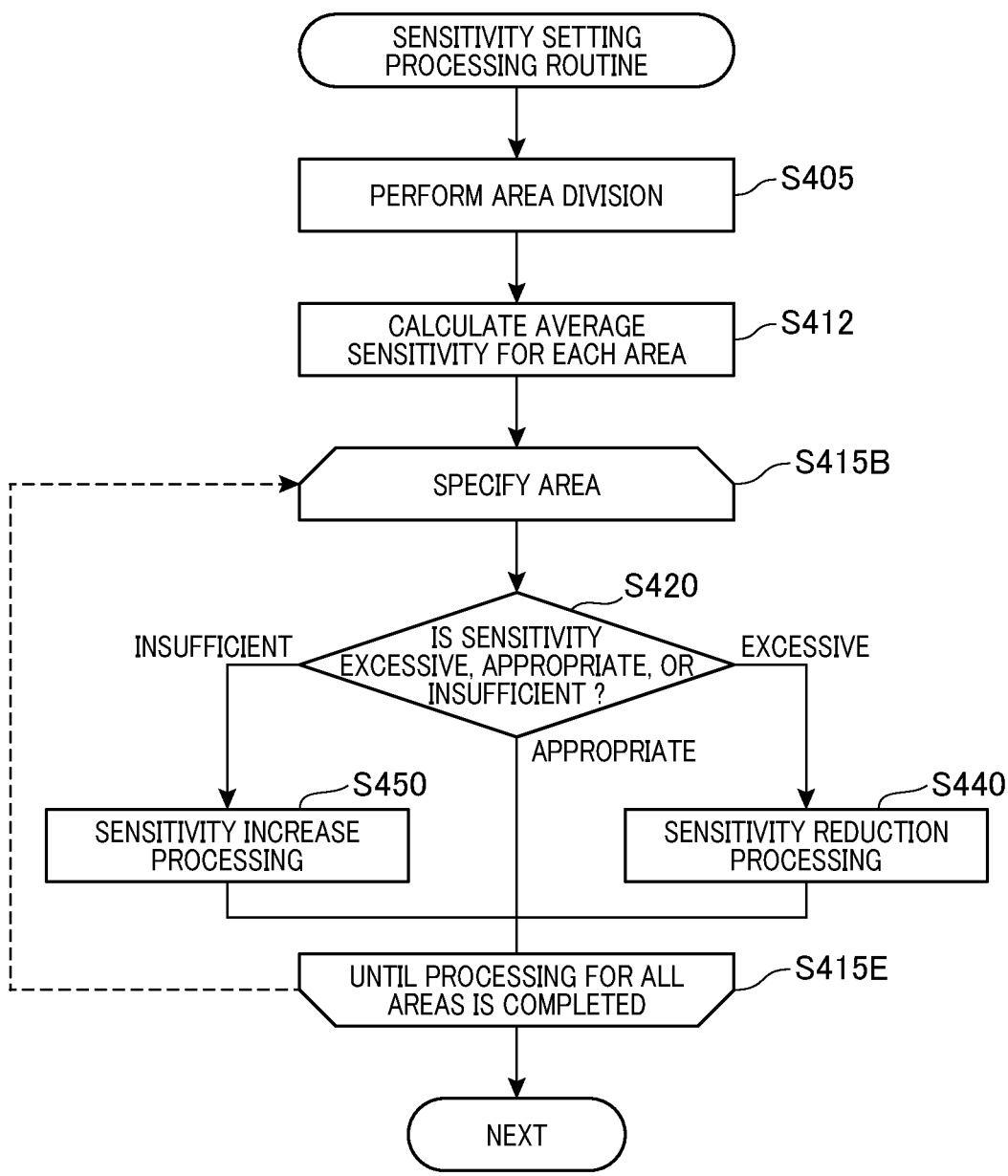
FIG. 13 is a flowchart illustrating a sensitivity setting processing routine in a second embodiment.

A second embodiment will be described. The second embodiment uses a hardware configuration similar to the hardware configuration of the first embodiment, and differs from the first embodiment in the contents of the sensitivity setting processing routine (FIG. 7: step S400) as illustrated in FIG. 13. The same reference signs are used for the same portions of the sensitivity setting processing of the second embodiment illustrated in FIG. 13 as those of the sensitivity setting processing in the first embodiment (FIG. 9), and detailed descriptions of the portions are omitted.

When the sensitivity setting processing routine illustrated in FIG. 13 is started, first, area division processing is executed (step S405). The area division processing is processing for dividing, into a plurality of areas, the peak intensity image Ipk determined by scanning by the optical system 30. In the first embodiment, the average sensitivity of the entire peak intensity image Ipk is determined (FIG. 9: step S410). However, in the second embodiment, the average sensitivity is determined for each area. For this purpose, the peak intensity image Ipk is pre-divided into a plurality of areas.

Figure 14:
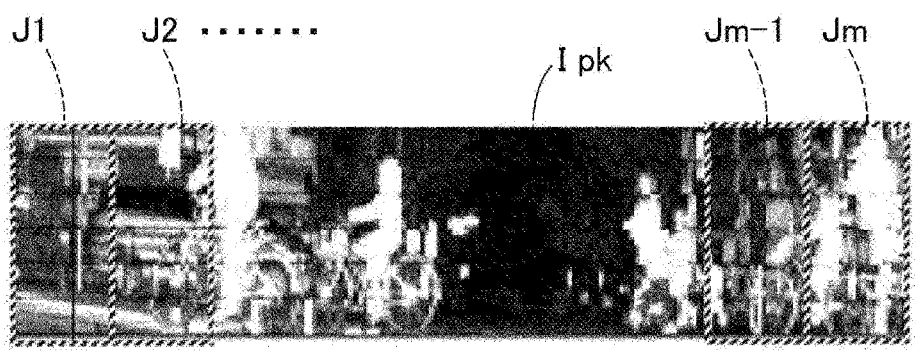
FIG. 14 is a descriptive diagram illustrating an example of division into a plurality of areas.
Figure 15:
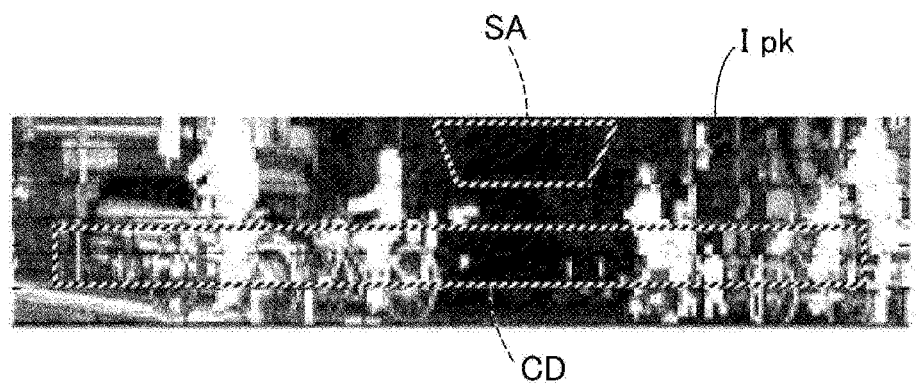
FIG. 15 is a descriptive diagram illustrating another example of division into a plurality of areas.
Figure 16:
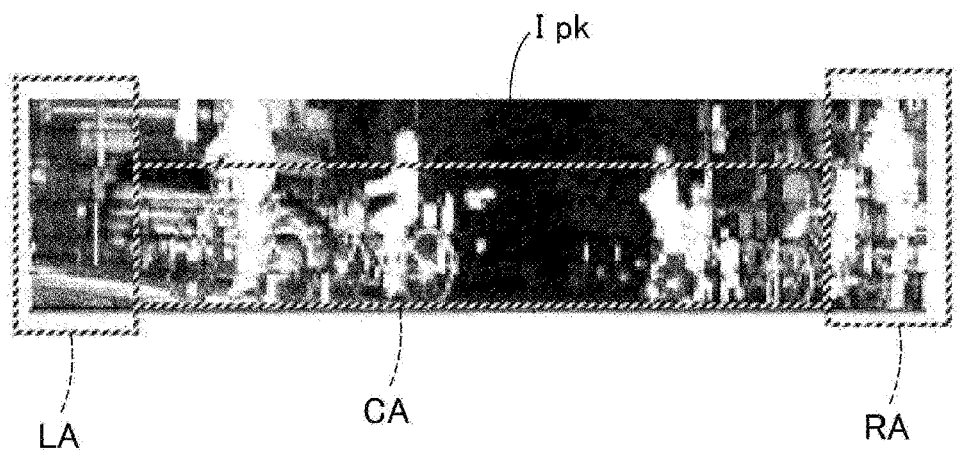
FIG. 16 is a descriptive diagram illustrating another example of division into a plurality of areas.

The area division is illustrated in FIG. 14, FIG. 15, and FIG. 16. FIG. 14 illustrates a case where the peak intensity image Ipk is divided into a plurality of areas J1, J2, . . . , Jm in the horizontal direction. In FIG. 15, the peak intensity image Ipk is divided into an area CD slightly later the vertical center of the scan range and except for horizontally opposite ends and the remaining area.

Note that, in FIG. 15, an area SA corresponds to the sky. The area SA corresponding to the sky can be determined from the fact that, in the peak intensity image Ipk, no peak is obtained in the area SA, and that the area SA is located above the scan area. FIG. 16 illustrates that the peak intensity image Ipk is divided into both end areas LA and RA and a center area CA sandwiched between the both end areas LA and RA and corresponding to approximately lower two-thirds of the scan range. The center area CA corresponds to approximately the lower two-thirds of the scan range in order to exclude the area SA corresponding to the sky.

In this manner, the scan range is divided into several areas (step S405), and the average sensitivity is computed for each area (step S412). Then, one of the areas resulting from the division is designated (step S415B), and until the processing is completed for all the areas (step S415E), the same processing as that in the first embodiment, that is, steps S420, S440, and S450 are repeated. The processing in steps S420, S440, and S450 is similar to the corresponding processing in the first embodiment. The contents of the sensitivity increase processing in step S450 and the sensitivity reduction processing in step S440 are also similar to the contents in the first embodiment.

According to the second embodiment described above, the average sensitivity is computed for each area, and an excessively high sensitivity is reduced, and an excessively low sensitivity is increased. Consequently, the sensitivity can be set within the appropriate range for each area. As a result, the sensitivity is prevented from being excessive, allowing degradation of durability of the laser element 35 and the like to be suppressed. Furthermore, for an area requiring a high sensitivity, such a sensitivity can be set. For example, in a case where the area is divided into a plurality of areas in the horizontal direction as in FIG. 14, the sensitivity can be set for each of the areas in the horizontal direction. Consequently, in a case where a high sensitivity is required for a center area in a vehicle traveling direction, it is easy to keep the sensitivity for the outer area low, while relatively increasing the sensitivity for an area nearer the center. In contrast, in a case where possible runout from the surroundings of the vehicle and the like are to be focused on for detection, the sensitivity for the outer area may be increased.

Additionally, in a case where the area division is performed as in FIG. 15, the average sensitivity for the area CD, which is important within the scan range, is used to adjust the general sensitivity. This enables a reduction in the amount of calculation for computing the sensitivity. Additionally, by detecting the area SA corresponding to the sky and excluding the area SA from the calculation of the average sensitivity, the average sensitivity is prevented from being calculated to be a value lower than the actual value.

In a case of the area division as in FIG. 16, the appropriate sensitivity can be retained for a center area that is important in terms of the vehicle traveling direction and for opposite areas that are important in terms of detection of possible runout from the right or left side of the vehicle. Of course, setting according to the traveling status of the vehicle can be made without any obstruction, for example, in a place such as expressway where possible runout of a person or a bicycle from the right or left side of the vehicle is unlikely to be assumed, the sensitivity for the center area CA is increased, and in a residential area or an urban area, the sensitivity for the both end areas LA and RA is increased.

C. Other Embodiments

Figure 17:
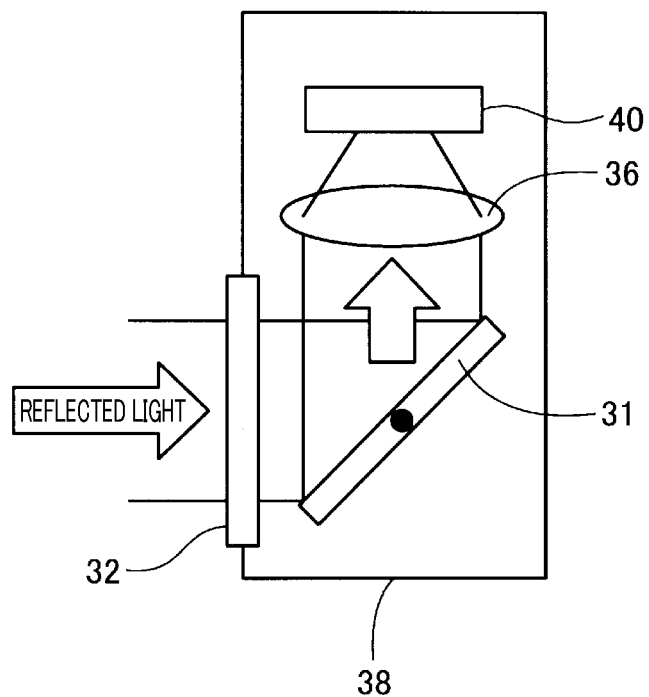
FIG. 17 is a descriptive diagram illustrating that light is reflected by a mirror and reflected light enters a light receiving unit.
Figure 18:
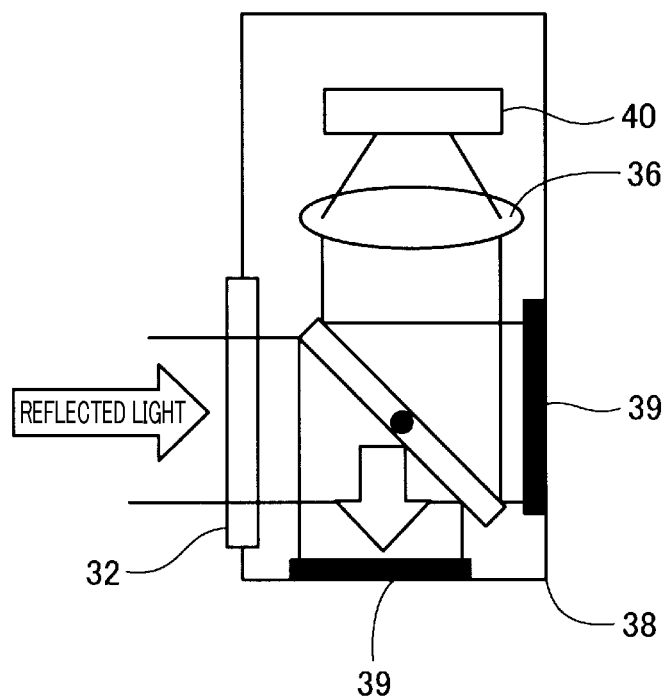
FIG. 18 is a descriptive diagram illustrating a configuration in which a mirror rotates at a predetermined timing to prevent reflected light from entering the light receiving unit.

In the first embodiment, when the adjustment signal CT1 is used to reduce the number of accumulating operations N to provide timings when no pulse is detected, the mirror 31 may be rotated to prevent reflected light from being incident on the light receiving array 40. FIG. 17 and FIG. 18 schematically illustrates such a configuration. FIG. 17 illustrates a case where reflected light is constantly incident on the light receiving array 40. In this case, a case 38 provided with a window 32 houses the mirror 31, the lens 36, the light receiving array 40, and the like, and reflected light traveling through the window 32 is reflected by the mirror 31 and is incident on the light receiving array 40.

In the configuration illustrated in FIG. 18, an absorbent 39 is provided on an inner wall of the case 38.

At the timing when no pulse is detected, the mirror 31 is rotated to reflect reflected light traveling through the window 32 toward the inner wall side on which the absorbent 39 is provided, rather than toward the light receiving array 40 side. This allows avoidance of reflected light being incident on the light receiving array 40, causing the avalanche diode Da and the like to operate. Consequently, adoption of such a configuration prevents the light receiving elements 50 in the light receiving array 40 from operating wastefully at a timing when no pulse is detected, without the need to stop or rest the laser element 35 or the light receiving array 40. This enables extension of the life of the light receiving element 50, in other words, the avalanche diode Da or allows suppression of degradation of reliability due to an increase in operating time.

In the configuration according to the first embodiment, with a constant number of light receiving elements 50 constituting each light receiving block 60, the number of detection pixels in the light receiving elements 50 is increased or reduced to adjust the sensitivity. However, the configuration may be such that the number of light receiving elements 50 constituting the block is dynamically changed. In this case, the output signals Sout from the light receiving elements 50 are temporarily stored in the memory, and readout addresses are set for the memory. This enables an apparent change in the number of light receiving elements 50 constituting each light receiving block 60. Of course, a digital signal processor (DSP) or the like may be used to dynamically increase or reduce the number of light receiving elements 50 in each light receiving block 60.

In the above-described embodiment, the light receiving blocks 60 each including a plurality of the light receiving elements 50 are provided in the light receiving array 40. However, the number of light receiving elements 50 included in the light receiving block 60 may be one. This is the same as a configuration in which no light receiving block 60 is present. In a case where the number of light receiving elements 50 included in the light receiving block 60 is one, the in-block accumulator 103 and the histogram generator 104 are unnecessary. In this case, the laser element 35 may provide a plurality of (for example, N) emissions, and the N-level accumulator 106 may accumulate the results of the emissions to determine a cumulative histogram.

The light receiving element in the above-described embodiment may be an element stochastically outputting a signal corresponding to reflected light, for example, a PIN diode or an SPAD, or a sensor of a CCD type or a CMOS type can be used that outputs a signal corresponding to the intensity of a signal corresponding to the reflected light.

In the above-described embodiment, the optical distance measuring device 20 is mounted to a vehicle, but may be mounted to any other moving body, for example, an airplane such as a drone, a ship, a robot, or the like. In a case where the optical distance measuring device 20 is mounted to the moving body can be used to measure the distance to an object in driving assistance for the moving body such as collision avoidance, or autonomous operation. Of course, the optical distance measuring device 20 can be utilized to measure the distance to an object around the moving body.

For example, the optical distance measuring device 20 can be used, for example, to acquire detailed data regarding the undulation of the ground.

The present disclosure is not limited to the above-described embodiments, and can be implemented using various configurations without departing from the spirits of the present disclosure. For example, the technical features of the embodiments can be replaced or combined in order to solve some or all of the above-described issues or to achieve some or all of the above-described effects. Additionally, the technical features can be deleted as appropriate unless the technical features are described herein as essential. For example, part of the configuration implemented using hardware in the above-described embodiments can be implemented using software. Additionally, at least part of the configuration implemented using software can be implemented using a discrete circuit configuration.

In the present disclosure, the optical distance measuring device (20) is an optical distance measuring device detecting a distance to an object, the optical distance measuring device including an emission unit (30) driving a light source (35) at a predetermined timing to emit light from the light source to a predetermined range of a space, a light receiving unit (40) including at least one light receiving element (50) detecting reflected light corresponding to the emitted light, the light receiving unit outputting a detection signal corresponding to the reflected light detected, a signal processing unit (103, 104, 106, 108) processing the detection signal to extract a peak signal corresponding to the reflected light from the object, a measurement unit (110, 112) measuring a distance to the object according to a time from driving of the light source by the emission unit until the peak signal is extracted, and an adjustment unit (80) outputting an adjustment signal changing performance for measurement of the distance to the object to at least one of the emission unit, the light receiving unit, and the signal processing unit, depending on a state of the peak signal output by the signal processing unit. The optical distance measuring device can be implemented as an optical distance measuring method or as applied examples described later.

In the above-described optical distance measuring device, the light receiving unit may include a plurality of light receiving elements, the signal processing unit may accumulate outputs from the light receiving elements to output, as the peak signal, a signal including a peak value corresponding to the reflected light, and the adjustment unit may compare the peak value with a predefined threshold to set the adjustment signal to be output. The optical distance measuring device can accumulate the outputs from the plurality of light receiving elements at a time, enabling a reduction in the time required for distance measurement. Furthermore, the optical distance measuring device accumulates the outputs from the light receiving elements to output the signal including the peak signal, allowing the signal to be easily differentiated from noise.

In such an optical distance measuring device, the emission unit may perform the emission a plurality of times during one distance measurement, and the signal processing unit accumulates the outputs from the light receiving elements by accumulating a plurality of outputs from the light receiving elements corresponding to the plurality of emissions. This requires only accumulation using the same light receiving elements, allowing the hardware configuration to be simplified.

Here, the adjustment unit may output the adjustment signal to the signal processing unit as a signal (CT1) changing the number of accumulating operations. Changing the number of accumulating operations allows the performance for distance measurement to be easily changed. Increasing the number of accumulating operations allows detection accuracy to be increased, and reducing the number of accumulating operations allows the calculation to be facilitated.

Here, the light receiving unit may include a plurality of light receiving blocks arranged in the light receiving unit and each including a set of a plurality of the light receiving elements, and the adjustment unit may output the adjustment signal to the signal processing unit or the light receiving unit as a signal (CT2 or SS2) changing the number of light receiving elements for which the outputs are accumulated. By changing the number of light receiving elements for which the outputs are accumulated, the performance for distance measurement can be easily changed. The number of light receiving elements may be changed by changing the number of those of the plurality of light receiving elements in the light receiving unit which are made inactive or changing, when the signals from the light receiving elements are accumulated, the number of light receiving elements intended for the accumulation. Increasing the number of light receiving elements for the accumulation allows the detection accuracy to be increased, and reducing the number of light receiving elements for the accumulation allows the calculation to be facilitated.

In the above-described optical distance measuring device, the adjustment unit may output the adjustment signal to the emission unit as a signal (LP) increasing or reducing an output of the light source. Increasing the output of the light source allows the detection signal to be enhanced to facilitate the detection, and reducing the output of the light source allows the life of the light source to be extended. Besides, the adjustment unit may output the adjustment signal as a signal (SS1) increasing or reducing light reception sensitivity of the light receiving unit. Increasing the light reception sensitivity increases the detection accuracy and reducing the light reception sensitivity typically allows extension of the life of the light receiving unit. The adjustment unit may output the adjustment signal in a case where the state of the detection signal output by the light receiving unit corresponds to at least one of a case where the intensity of the reflected light deviates from a predefined range from a lower limit value to an upper limit value or where the S/N ratio deviates from a predefined range from a lower limit value to an upper limit value.

In the above-described optical distance measuring device, the light receiving unit may output the detection signal for each of a plurality of areas into which the predetermined range of the space to which the light from the light source is emitted is divided, the signal processing unit may output the peak signal for each of the plurality of areas, and the adjustment unit may define the adjustment signal according to the state of the peak signal for each of the plurality of areas and output the peak signal corresponding to each of the plurality of areas. This enables the adjustment signal to be defined for each of the areas resulting from the division, allowing the performance for distance measurement to be changed for each area.

In the optical distance measuring device described above, the light receiving unit may output the detection signal for at least one of a plurality of areas into which the predetermined range of the space to which the light from the light source is emitted is divided, the signal processing unit may output the peak signal in accordance with the detection signal output, and the adjustment unit may define the adjustment signal according to the state of the peak signal and output the adjustment signal. Thus, the detection signal may be determined for at least one of the plurality of areas, allowing the configuration to be simplified.

What is claimed is:

1. An optical distance measuring device for detecting a distance to an object, the optical distance measuring device comprising:
    an emission unit driving a light source at a predetermined timing to emit light from the light source to a predetermined range of a space;
    a light receiving unit including at least one light receiving element detecting reflected light corresponding to the emitted light, the light receiving unit outputting a detection signal corresponding to the reflected light detected;
    a signal processing unit processing the detection signal to extract a peak signal including a peak value corresponding to the reflected light from the object;
    a measurement unit measuring a distance to the object according to a time from driving of the light source by the emission unit until the peak value of the extracted peak signal is reached; and
    an adjustment unit outputting an adjustment signal changing performance for measurement of the distance to the object to at least one of the emission unit, the light receiving unit, and the signal processing unit, depending on a state of the peak signal output by the signal processing unit, the state of the peak signal including an intensity and a width of the peak signal, wherein
    the light receiving unit includes a plurality of light receiving elements,
    the signal processing unit accumulates outputs from the light receiving elements to output, as the peak signal, a signal including a peak value corresponding to the reflected light,
    the adjustment unit compares the peak value with a predefined threshold to set the adjustment signal to be output,
    the emission unit performs the emission a plurality of times during one distance measurement,
    the signal processing unit accumulates the outputs from the light receiving elements by accumulating a plurality of outputs from the light receiving elements corresponding to the plurality of emissions, and
    the adjustment unit outputs the adjustment signal to the signal processing unit as a signal changing the number of accumulating operations.

2. The optical distance measuring device according to claim 1, wherein
    the adjustment unit outputs the adjustment signal to the emission unit as a signal increasing or reducing an output of the light source.

3. The optical distance measuring device according to claim 1, wherein
    the adjustment unit outputs the adjustment signal as a signal increasing or reducing light reception sensitivity of the light receiving unit.

4. The optical distance measuring device according to claim 1, wherein
    the adjustment unit outputs the adjustment signal in a case where the state of the detection signal output by the light receiving unit corresponds to at least one of a case where an intensity of the reflected light deviates from a predefined range from a lower limit value to an upper limit value and a case where an S/N ratio deviates from a predefined range from a lower limit value to an upper limit value.

5. The optical distance measuring device according to claim 1, wherein
the light receiving unit outputs the detection signal for each of a plurality of areas into which the predetermined range of the space to which the light from the light source is emitted is divided,
the signal processing unit outputs the peak signal for each of the plurality of areas, and
the adjustment unit defines the adjustment signal according to the state of the peak signal for each of the plurality of areas and outputs the peak signal corresponding to each of the plurality of areas.

6. The optical distance measuring device according to claim 1, wherein
the light receiving unit outputs the detection signal for at least one of a plurality of areas into which the predetermined range of the space to which the light from the light source is emitted is divided,
the signal processing unit outputs the peak signal in accordance with the detection signal output, and
the adjustment unit defines the adjustment signal according to the state of the peak signal and output the adjustment signal.

7. An optical distance measuring method for detecting a distance to an object, the optical distance measuring method comprising:
driving a light source at a predetermined timing to emit light from the light source to a predetermined range of a space a plurality of times during one distance measurement;
each time light is emitted from the light source, detecting reflected light corresponding to the emitted light at a plurality of light receiving elements and accumulating outputs from the plurality of light receiving elements to output a detection signal corresponding to the reflected light detected;
accumulating a plurality of detection signals corresponding to the plurality of time light is emitted from the light source, to extract a peak signal including a peak value corresponding to the reflected light from the object;
measuring a distance to the object according to a time from driving of the light source until the peak value of the extracted peak signal is reached; and
changing performance for measurement of the distance to the object depending on a state of the detection signal, the state of the peak signal including an intensity and a width of the peak signal, wherein
the changing performance includes comparing the peak value with a predefined threshold to output an adjustment signal for changing the number of times light is emitted from the light source during one distance measurement.

8. An optical distance measuring method for detecting a distance to an object, the optical distance measuring method comprising:
driving a light source at a predetermined timing to emit light from the light source to a predetermined range of a space;
detecting reflected light corresponding to the emitted light at a plurality of light receiving elements and accumulating outputs from the plurality of light receiving elements to output a detection signal corresponding to the reflected light detected;
processing the detection signal to extract a peak signal including a peak value corresponding to the reflected light from the object;
measuring a distance to the object according to a time from driving of the light source until the peak value of the extracted peak signal is reached; and
changing performance for measurement of the distance to the object depending on a state of the detection signal, the state of the peak signal including an intensity and a width of the peak signal, wherein
the changing performance includes comparing the peak value with a predefined threshold to output an adjustment signal for changing a number of light receiving elements for which the outputs are accumulated.

9. An optical distance measuring device for detecting a distance to an object, the optical distance measuring device comprising:
an emission unit driving a light source at a predetermined timing to emit light from the light source to a predetermined range of a space;
a light receiving unit including at least one light receiving element detecting reflected light corresponding to the emitted light, the light receiving unit outputting a detection signal corresponding to the reflected light detected;
a signal processing unit processing the detection signal to extract a peak signal including a peak value corresponding to the reflected light from the object;
a measurement unit measuring a distance to the object according to a time from driving of the light source by the emission unit until the peak value of the extracted peak signal is reached; and
an adjustment unit outputting an adjustment signal changing performance for measurement of the distance to the object to at least one of the emission unit, the light receiving unit, and the signal processing unit, depending on a state of the peak signal output by the signal processing unit, the state of the peak signal including an intensity and a width of the peak signal,
the light receiving unit includes a plurality of light receiving elements,
the signal processing unit accumulates outputs from the light receiving elements to output, as the peak signal, a signal including a peak value corresponding to the reflected light, and
the adjustment unit compares the peak value with a predefined threshold to set the adjustment signal to be output,
the light receiving unit includes a plurality of light receiving blocks arranged in the light receiving unit and each including a set of a plurality of the light receiving elements, and
the adjustment unit outputs the adjustment signal to the signal processing unit or the light receiving unit as a signal changing the number of light receiving elements for which the outputs are accumulated.

10. The optical distance measuring device according to claim 9, wherein
the adjustment unit outputs the adjustment signal to the emission unit as a signal increasing or reducing an output of the light source.

11. The optical distance measuring device according to claim 9, wherein
the adjustment unit outputs the adjustment signal as a signal increasing or reducing light reception sensitivity of the light receiving unit.

12. The optical distance measuring device according to claim 9, wherein
the adjustment unit outputs the adjustment signal in a case where the state of the detection signal output by the light receiving unit corresponds to at least one of a case where an intensity of the reflected light deviates from a predefined range from a lower limit value to an upper limit value and a case where an S/N ratio deviates from a predefined range from a lower limit value to an upper limit value.

13. The optical distance measuring device according to claim 9, wherein
the light receiving unit outputs the detection signal for each of a plurality of areas into which the predetermined range of the space to which the light from the light source is emitted is divided,
the signal processing unit outputs the peak signal for each of the plurality of areas, and
the adjustment unit defines the adjustment signal according to the state of the peak signal for each of the plurality of areas and outputs the peak signal corresponding to each of the plurality of areas.

14. The optical distance measuring device according to claim 9, wherein
the light receiving unit outputs the detection signal for at least one of a plurality of areas into which the predetermined range of the space to which the light from the light source is emitted is divided,
the signal processing unit outputs the peak signal in accordance with the detection signal output, and
the adjustment unit defines the adjustment signal according to the state of the peak signal and output the adjustment signal.

* * * * *